United States Patent [19]

Rausnitz

[11] Patent Number: 5,526,180
[45] Date of Patent: Jun. 11, 1996

[54] MULTIFUNCTION GLARE SCREEN

[75] Inventor: Gerald J. Rausnitz, Remsenberg, N.Y.

[73] Assignee: Tyrolit Company, Inc., West Babylon, N.Y.

[21] Appl. No.: 297,015

[22] Filed: Aug. 29, 1994

[51] Int. Cl.⁶ .............................. G02B 27/00; B41J 11/02
[52] U.S. Cl. ...................... 359/609; 359/601; 248/442.2; 248/918
[58] Field of Search .................... 359/601–615, 359/811, 819, 892; 348/818–824, 832–842; 248/917–924, 444.2, 447.1–447.2; 312/7.2, 233; 379/450

[56] References Cited

U.S. PATENT DOCUMENTS

| | | | |
|---|---|---|---|
| 3,209,085 | 9/1965 | Farina | 379/450 |
| 4,693,443 | 9/1987 | Drain | 248/918 |
| 4,863,242 | 9/1989 | Correa | 359/601 |
| 4,960,257 | 10/1990 | Waters | 248/442.2 |
| 5,082,235 | 1/1992 | Crowther et al. | 248/447.2 |
| 5,227,916 | 7/1993 | Theirl et al. | 359/609 |
| 5,274,501 | 12/1993 | Stroll, Jr. | 359/609 |
| 5,448,405 | 9/1995 | Clausen et al. | 359/609 |

Primary Examiner—Thong Q. Nguyen
Attorney, Agent, or Firm—Levine & Mandelbaum

[57] ABSTRACT

A multifunction glare screen for a monitor with a video display has a filter mounted in a frame. The frame is provided with a grasping clip which can be removably mounted on either side thereof for holding a document. L-shaped suspension devices insertable into slots in the frame are attachable to the monitor for suspending the filter in front of the video display. Arms with grooves are provided on the suspension device for storing a writing or pointing instrument.

4 Claims, 2 Drawing Sheets

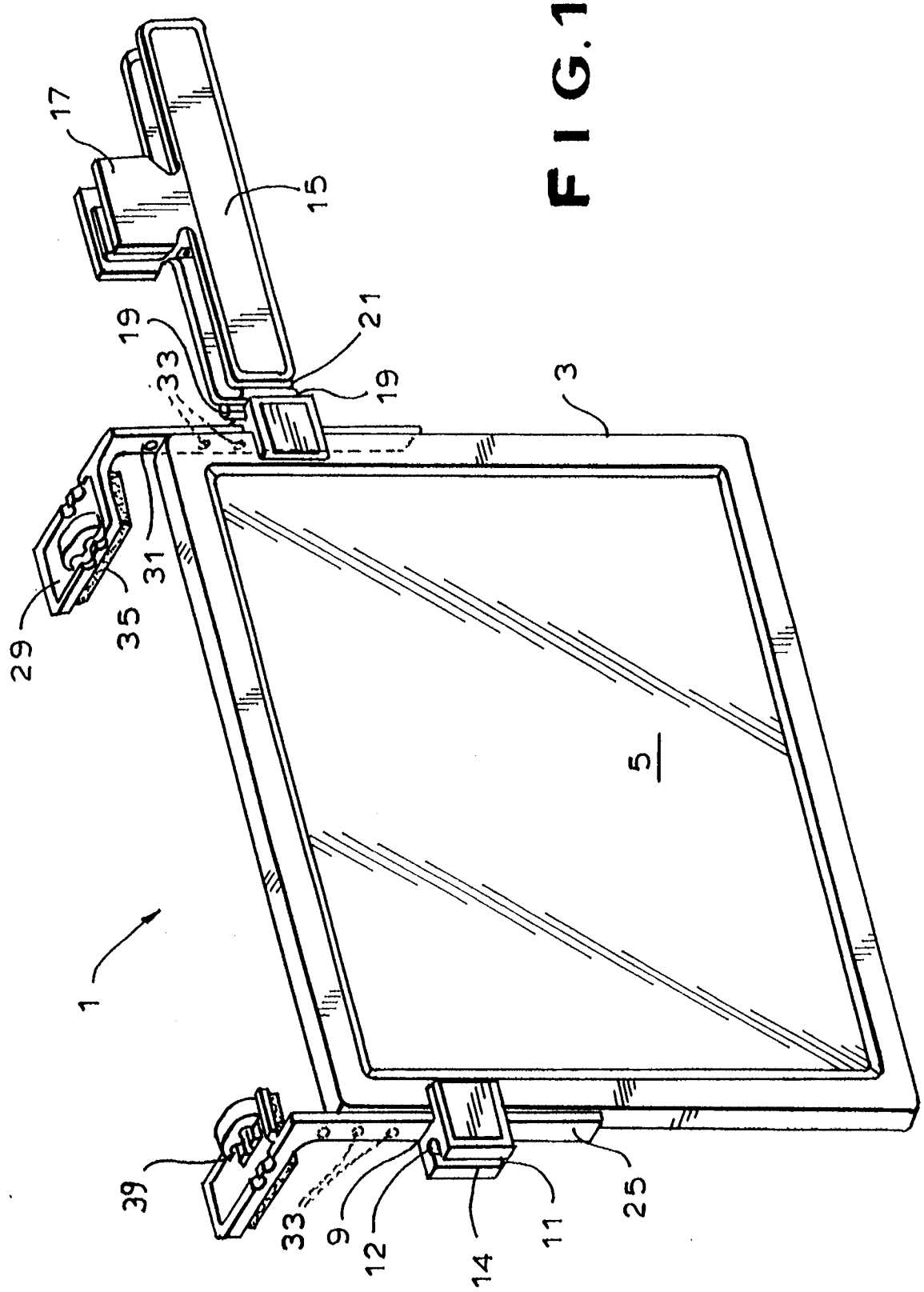

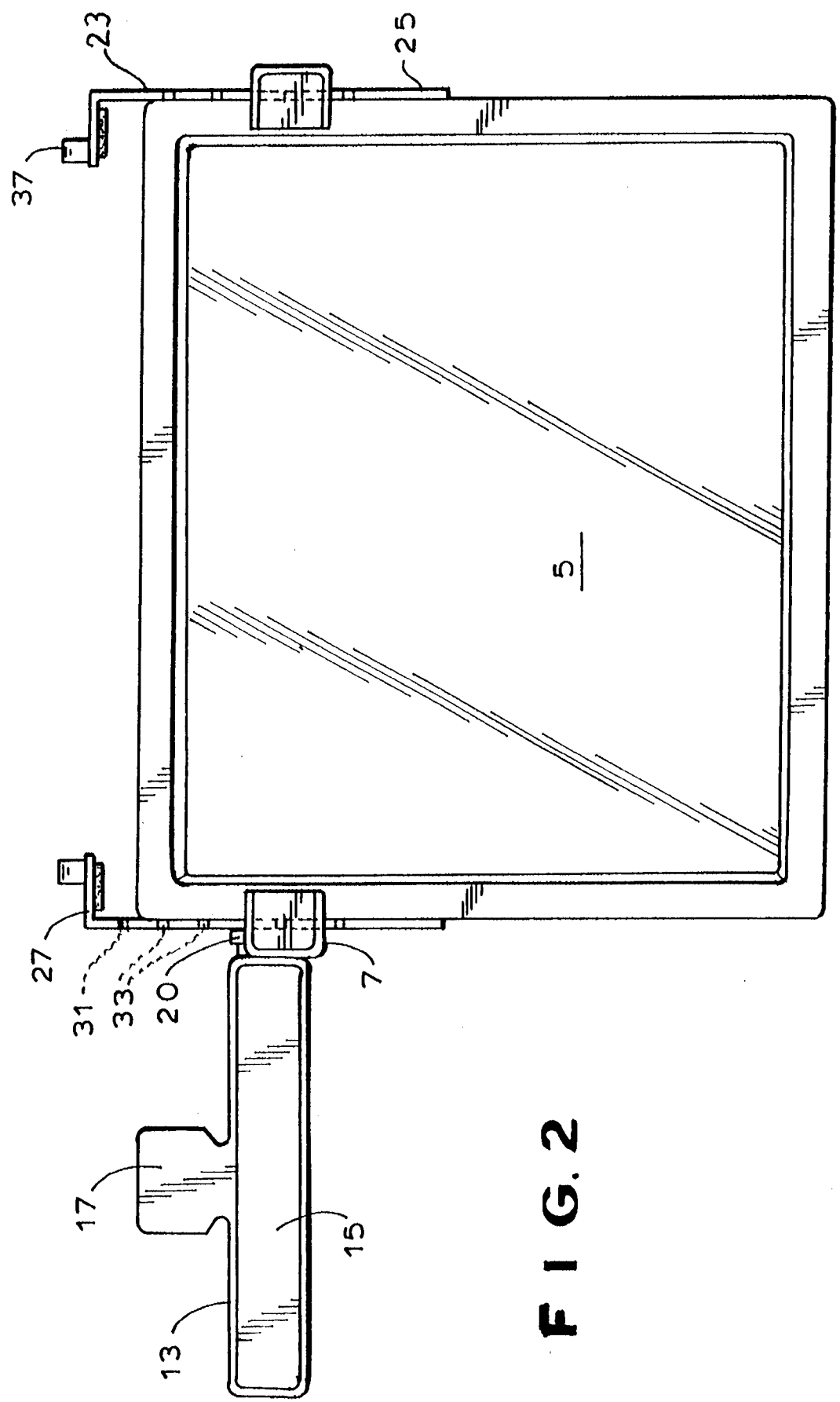

MULTIFUNCTION GLARE SCREEN

BACKGROUND OF THE INVENTION

This invention relates to a screen for a monitor having a video display for use with a computer or computer terminal. More specifically, the invention is directed to the construction of a screen for a computer monitor which, in addition to reducing glare from reflections, can also serve as a copy holder and a pen and pencil holder.

It is known in the art to view the video monitor of a computer or computer terminal through a partially transparent screen in order to prevent reflections of ambient light which decrease contrast and interfere with the viewing of the image displayed by the monitor. Such screens usually employ either a closely woven mesh of nylon or similar material or a polarizing glass. In addition to reducing glare, screens of this type are sometimes effective in blocking harmful radiation which can cause cataracts or have other undesirable effects on the computer operator who must view the monitor, often for several hours each day.

It is also known in the art to provide a computer or computer terminal operator with a copy holder for supporting a document in a position where it can be readily viewed by the operator for typing information from the document for entry into the memory of a computer, or for using the document as a reference for instructional purposes.

Operators of computers and computer terminals sometimes use pointing and reading devices in the shape of a writing instrument, e.g., a light pen, and, of course, must also have available to them, ordinary pens and pencils for writing on paper. It is further known in the art to provide holders with receptacles for pen-shaped devices in order to make such instruments readily available to the operator and avoid time wasted by searching for such instruments which may be misplaced if not provided with a dedicated storage facility.

Due to the limited desk space available at a computer work station, it is often inconvenient and, sometimes, not possible to have a copy holder and/or writing or pointing instrument receptacle present. Although there are copy holders which can be attached to a monitor, they can sometimes deface the housing of the monitor or interfere with its ventilation and ability to dissipate heat.

SUMMARY OF THE INVENTION

The aforementioned problems of the prior art are overcome by the instant invention which provides for a monitor screen having a frame with an integral copy holder and pointing-writing instrument holder. More specifically, the present invention is directed to a multifunction glare screen for a monitor having a video display including a frame, a filter mounted within the frame for blocking harmful radiation from the monitor, and a grasping clip mounted on the frame for holding a document adjacent thereto. There is a first connector fixedly mounted on the frame, and a second connector fixedly mounted on the grasping clip, the first and second connectors being mutually removably engageable for removably mounting the grasping clip on the frame. The first connector is mounted on one side of the frame and the second connector is mounted one side of the grasping clip. In addition there is a third connector mounted on another side of the frame and a fourth connector mounted on another side of the grasping clip, the third and fourth connectors being mutually removably engageable for removably mounting the grasping clip on the other side of the frame.

The grasping clip has first and second members, the first member being movable with respect to the second member for inserting the document therebetween to be grasped. The second connector is mounted on one of the members and the fourth connector is mounted on the other of the members. There are also first and second adjustable suspension devices for attaching the glare screen to the video monitor, each suspension device having a leg and a platform connected thereto. The longitudinal axis of each leg is transverse to the respective platform. Each platform has an undersurface with adhesive for adhering to the monitor, there being a slot between the frame and the first connector for receiving the leg of the first suspension device and a slot between the frame and the third connector for receiving the leg of the second suspension device. The platform has an upper surface with a holder for a writing or pointing instrument. The holder includes an arm parallel to the platform upper surface. The platform upper surface and the arm have opposing grooves.

It is therefore an object of the invention to provide a single apparatus which can perform the functions of glare reduction, radiation shielding, copy holding and pointing-writing instrument storage.

Another object of the invention is to provide an apparatus which can perform the functions of glare reduction, radiation shielding, copy holding and pointing-writing instrument storage without occupying any desk space.

Still another object of the invention is to provide an apparatus which can perform the functions of glare reduction, radiation shielding, copy holding and pointing-writing device storage which can be manufactured at a cost less than the sum of the costs of individual devices for performing all of the foregoing functions.

A further object of the invention is to provide an apparatus which can perform the functions of glare reduction, radiation shielding, copy holding and pointing-writing device storage which is equally suitable for use by right-handed and left-handed operators.

Other and further objects of the invention will be apparent from the following drawings and description of a preferred embodiment of the invention in which like reference numerals are used to indicate like parts in the various views.

DESCRIPTION OF THE DRAWINGS

FIG. 1 is a perspective view of a multifunction glare screen in accordance with the preferred embodiment of the invention; and FIG. 2 is a rear elevation view of a multifunction glare screen in accordance with the preferred embodiment of the invention.

DESCRIPTION OF THE PREFERRED EMBODIMENT

Referring now to FIGS. 1 and 2 of the drawings, there is shown a multifunction glare screen 1 having a substantially rectangular frame 3. Mounted within the frame 3 is a partially transparent filter 5 which, in the preferred embodiment of the invention is formed from a polarizing glass to reduce reflective glare and filter out harmful radiation as will be known to those skilled in the art. Alternatively, the filter 5 may be made of a fine mesh of nylon or similar material which, although less effective than a polarizing glass, is also less expensive.

The dimensions and aspect ratio of the frame 3 and filter 5 are such as to enable an unimpaired view of the video display of a computer monitor on which the screen 1 is to be mounted.

Fixedly mounted on each of opposite vertical edges of the frame 3 is a copy holder receptacle 7. Each of the receptacles 7, which are integral with the frame 3 and may be formed during the molding of the frame 3 from a plastic material, has a rectangular vertical slot 9 and a laterally displaced vertical keyway 11. The keyway 11 has a cylindrical bore 12 opening along its wall into a rectangular slot 14.

A spring-loaded document clip 13 has grasping members 15 with respective integral grip members 17. Along opposing vertical edges of each of the grasping members 15 is a key 19 in the form of a solid vertical cylinder 20 connected to the edge of its respective member 15, by a rectangular web 21. The diameter of the vertical cylinder 20 is slightly less than the diameter of the cylindrical bore 12 and greater than the width of the slot 14. The width of the web 21 is slightly less than the width of the slot 14. Accordingly, the document clip 13 may be removably mounted on either side of the frame 3 by sliding the key 19 of the grasping member 15 into the keyway 11 of the receptacle 7 on the side of the screen 1 on which the operator wishes to support documents to be held by the document clip 13.

Each of two L-shaped brackets 23 of mirror image configuration has a vertical leg 25 of rectangular across section and a horizontal top arm 27 which is integral with a platform 29. The dimensions of the rectangular cross sections of bracket legs 25 are slightly less than the corresponding dimensions of the rectangular slots 9 so that the legs 25 can be inserted into respective slots 9 a sufficient distance to center the screen 1 over the display area of the monitor on which the screen 1 is to be mounted when the underside of the platforms 29 engage the top of the monitor housing (not shown). The underside of the platforms 29 are provided with an adhesive coating for adhering them to the upper surface of the monitor housing.

The inner surfaces of the legs 25 of the brackets 23 have axially spaced semispherical blind apertures 31 for receiving one or more semispherical projections 33 on the outer vertical edges of the frame 3. Due to a camming action between the projections 33 and apertures 31, the legs 25 can be temporarily locked relative to the frame 3 with the coupling sufficient to support the weight of the screen 1 on the monitor housing when the projections 33 are received in apertures 31. The height of the brackets 23 relative to the frame 3 can be adjusted by application of force between each bracket 23 and the frame 3 in a direction parallel to the legs 25 thereby causing the projections 33 to be cammed out of the apertures 31 in which they are received and allowing them to be received in axially displaced apertures.

The upper surfaces of the platforms 29 have grooves 35 running parallel to the plane of the screen 1 as best seen in FIG. 1. Extending upwardly from the upper surface of each platform 29 and over the grooves 35 is a resilient arm 37 having grooves 39 in one-to-one parallel relationship to the grooves 35. The maximum distance between the arms 37 and platforms 29 within the grooves 35 and 39 is approximately ⅜ of an inch to snugly but releasably receive a standard pencil or pen, or a computer pointing device such as a light pen.

It is to be appreciated that the foregoing is a description of a preferred embodiment of the invention to which variations and modifications may be made without departing from the spirit and scope of the invention.

What is claimed is:

1. A multifunction glare screen for a monitor having a video display comprising:

a frame;

a filter mounted within said frame for reducing glare and blocking harmful radiation from said monitor;

document grasping means having first and second members; said first member being movable with respect to said second member for inserting a document therebetween to be grasped;

first connector means mounted on one side of said frame;

second connector means mounted on said first member of said grasping means;

third connector means mounted on another side of said frame;

fourth connector means mounted on said second member of said grasping means said first and second connector means being mutually removably engageable for removably mounting said grasping means on one side of said frame and said third and fourth connector means being mutually removably engageable for alternatively removably mounting said grasping means on said another side of said frame in lieu of said one side; and first and second adjustable suspension means for attaching said glare screen to said video monitor, each of said first and second suspension means having a leg and a platform connected thereto, a longitudinal axis of each leg being transverse to its respective platform, each platform having an undersurface with adhesion means for adhering to said monitor, there being a slot disposed between said frame and said first connector means for receiving the leg of said first suspension means and a slot disposed between said frame and said third connector means for receiving the leg of said second suspension means.

2. A multifunction glare screen for a video monitor according to claim 1 wherein at least one of said platforms has an upper surface and further comprising means mounted on said suspension means which comprises said at least one platform, and extending over said upper surface for holding a writing or pointing instrument.

3. A multifunction glare screen for a video monitor according to claim 2 wherein said holding means comprises an arm parallel to said platform upper surface.

4. A multifunction glare screen for a video monitor according to claim 3 wherein said platform upper surface and said arm have opposing grooves.

* * * * *